(12) United States Patent
Hasegawa et al.

(10) Patent No.: US 6,622,710 B2
(45) Date of Patent: Sep. 23, 2003

(54) INTERNAL COMBUSTION ENGINE

(75) Inventors: Kazuya Hasegawa, Tokyo (JP);
Hiroshi Miyakubo, Yokosuka (JP);
Koudai Yoshizawa, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/986,890

(22) Filed: Nov. 13, 2001

(65) Prior Publication Data

US 2002/0069859 A1 Jun. 13, 2002

(30) Foreign Application Priority Data

Dec. 8, 2000  (JP) ........................ 2000-374771

(51) Int. Cl.⁷ .............................................. F02B 33/00
(52) U.S. Cl. ................................................ 123/563
(58) Field of Search ............................. 123/563, 564, 123/305, 559.3

(56) References Cited

U.S. PATENT DOCUMENTS 4,995,347 A * 2/1991 Tate et al. ............... 123/564
5,477,839 A * 12/1995 Oshima et al. ........... 123/559.3
6,293,246 B1 * 9/2001 Tanahashi et al. .......... 123/305

FOREIGN PATENT DOCUMENTS

| DE | 4103870 A1 | * | 8/1991 | ............... 123/563 |
| DE | 4308354 A1 | * | 9/1993 | ............... 123/563 |
| JP | 04091321 A | * | 3/1992 | ............... 123/563 |
| JP | 04303124 A | * | 10/1992 | ........... F02B/33/44 |
| JP | 05125947 A | * | 5/1993 | ............... 123/563 |
| JP | 11-210477 A |   | 8/1999 | |
| JP | 11-210539 A |   | 8/1999 | |

* cited by examiner

*Primary Examiner*—Thomas Denion
*Assistant Examiner*—Thai-Ba Trieu
(74) *Attorney, Agent, or Firm*—Shinjyu Global IP Counselors, LLP

(57) ABSTRACT

A self-ignition combustion engine has a control unit that controls the temperature of the intake air such that the operating load range of compression self-ignition combustion is expanded. In operating regions where cooling the intake air results in an intake air temperature that is too low and an inability to conduct self-ignition operation, the temperature of the intake air is raised by directing intake air that has been supercharged by a supercharger to a bypass passage so that it does not pass through an inter-cooler.

20 Claims, 17 Drawing Sheets

INTERNAL COMBUSTION ENGINE

This application claims priority to Japanese Patent Application No. 2000-374771. The entire disclosure of Japanese Patent Application No. 2000-374771 is hereby incorporated herein by reference.

BACKGROUND OF THE PRESENT INVENTION

1. Field of the Present Invention

The present invention generally relates to a self-ignition type internal combustion engine that has a supercharger with a cooling device for cooling intake air from the supercharger, and that utilizes the compressive action of a piston to cause an air-fuel mixture in a combustion chamber to self-ignite and combust.

2. Background Information

As a highly efficient low-emissions gasoline internal combustion engine, a self-ignition type internal combustion engine with a high compression ratio has been proposed which achieves low NOx and high efficiency resulting from lean burning by combusting a pre-mixture using compression self-ignition combustion. This self-ignition type internal combustion engine has a narrow load range in which it can be operated. More particularly, in order to secure a region in which the engine rotational speed and engine load are both high, it is necessary to use supercharging to maintain the operable range.

As seen in FIG. 18, an explanatory graph is illustrated showing the operating region for which self-ignition combustion is possible when the supercharging pressure is constant. In FIG. 18, region (I) is without supercharging, region (II) is with supercharging, and region (III) involves cooling the intake air after supercharging to the minimum temperature for which ignition is possible. When these regions are compared at a constant supercharging pressure, the maximum load range, for which operation is possible, declines as the engine rotational speed increases. However, since supercharging is conducted in regions (II) and (III), the maximum load range for which operation is possible is higher in these regions than in region (I).

The high load limit side of the operating load is limited by knocking; this knocking is defined by the mixture ratio of the air-fuel mixture, e.g., the value obtained by dividing the amount of air by the amount of fuel. Therefore, since the operating load range is expanded, it is possible to cool the intake air, whose temperature was raised by supercharging, to a temperature for which compression self-ignition can be conducted and increase the amount of air introduced into the combustion chamber.

Due to the characteristics of the supercharger, the maximum supercharging pressure and the amount of intake air both increase as the engine rotational speed increases. When the maximum supercharging pressure of the supercharger is used, the operable range is shown in FIG. 19. Here, regions (I), (II), and (III) correspond to regions (I), (II), and (III) in FIG. 18. The maximum load range for which operation is possible in regions (II) and (III) (where supercharging is conducted) is higher than in FIG. 18. In particular, region (III) (where the intake air is cooled after supercharging) allows operation in a higher load range than in region (II) (where knocking occurs in section A when the, temperature is high). However, when the intake air is merely cooled after supercharging, there are operating regions where the temperature of the intake air is too low and self-ignition operation is not possible. Thus, there is room for improvement.

Japanese Laid-Open Patent Publication No. 11-210477 discloses an internal combustion engine that attempts to prevent overcooling of the intake air. Specifically, this publication proposes providing a bypass passage that bypasses the inter-cooler that cools the intake air after supercharging and controls the temperature of the intake air by passing all of the post-supercharging intake air through the bypass passage during warming up and low-load operation, at which times operation is stratified.

Japanese Laid-Open Patent Publication No. 11-210539 discloses an internal combustion engine in which the temperature inside the combustion chamber is detected by using a temperature sensor installed in the intake port, the EGR gas amount is controlled, and the opening timing of the intake valve is controlled. In this way, the temperature of the gas inside the combustion chamber is held at a temperature for which self-ignition will occur when assist ignition is conducted using a spark plug.

In view of the above, there exists a need for an improved internal combustion engine that utilizes the high efficiency and low emissions of compression self-ignition combustion to the maximum degree and that secures an operable range up to high load regions. This invention addresses this need in the art as well as other needs, which will become apparent to those skilled in the art from this disclosure.

SUMMARY OF THE PRESENT INVENTION

In order to utilize the high efficiency and low emissions of compression self-ignition combustion to the maximum degree and secure an operable range up to high load regions, it is necessary to execute control such that the intake air introduced into the combustion chamber is brought to the optimum temperature state in response to the operating conditions at the time, i.e., the engine rotational speed and required load.

However, while the inventions described in the aforementioned publications control the intake air temperature or the temperature of the gas inside the combustion chamber, they do not control to the temperature state that is optimum with respect to the aforementioned operating conditions necessary for compression self-ignition combustion. Consequently, it is not possible to expand the operating load range of compression self-ignition combustion.

Therefore, the purpose of the present invention is to control the temperature of the intake air so as to expand the operating load range of compression self-ignition combustion.

In order to achieve the aforementioned purpose a self-ignition internal combustion engine is provided that comprises a combustion chamber, a supercharger, a cooling device, a cooling bypass path, a cooling bypass flow rate valve and a controller. The combustion chamber has an intake passage, an exhaust passage and a piston in the combustion chamber for compressive action to cause an air-fuel mixture to self-ignite and combust. The supercharger is connected to the intake passage upstream of the combustion chamber. The cooling device is located in the intake passage between the supercharger and the combustion chamber to cool intake air from the supercharger. The cooling bypass path has an inlet and an outlet with the inlet fluidly coupled to the intake passage between the supercharger and the cooling device and the outlet fluidly coupled to the intake passage between the cooling device and the combustion chamber. The cooling bypass flow rate valve is arranged to regulate an opening to adjust an amount of intake air that passes through the cooling bypass path. The controller is operatively coupled to the cooling bypass flow rate valve to control the opening of the cooling bypass flow rate valve based on operational conditions of the combustion chamber to perform self-igniting combustion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the present invention as defined by the appended claims and their equivalents.

Figure 1:
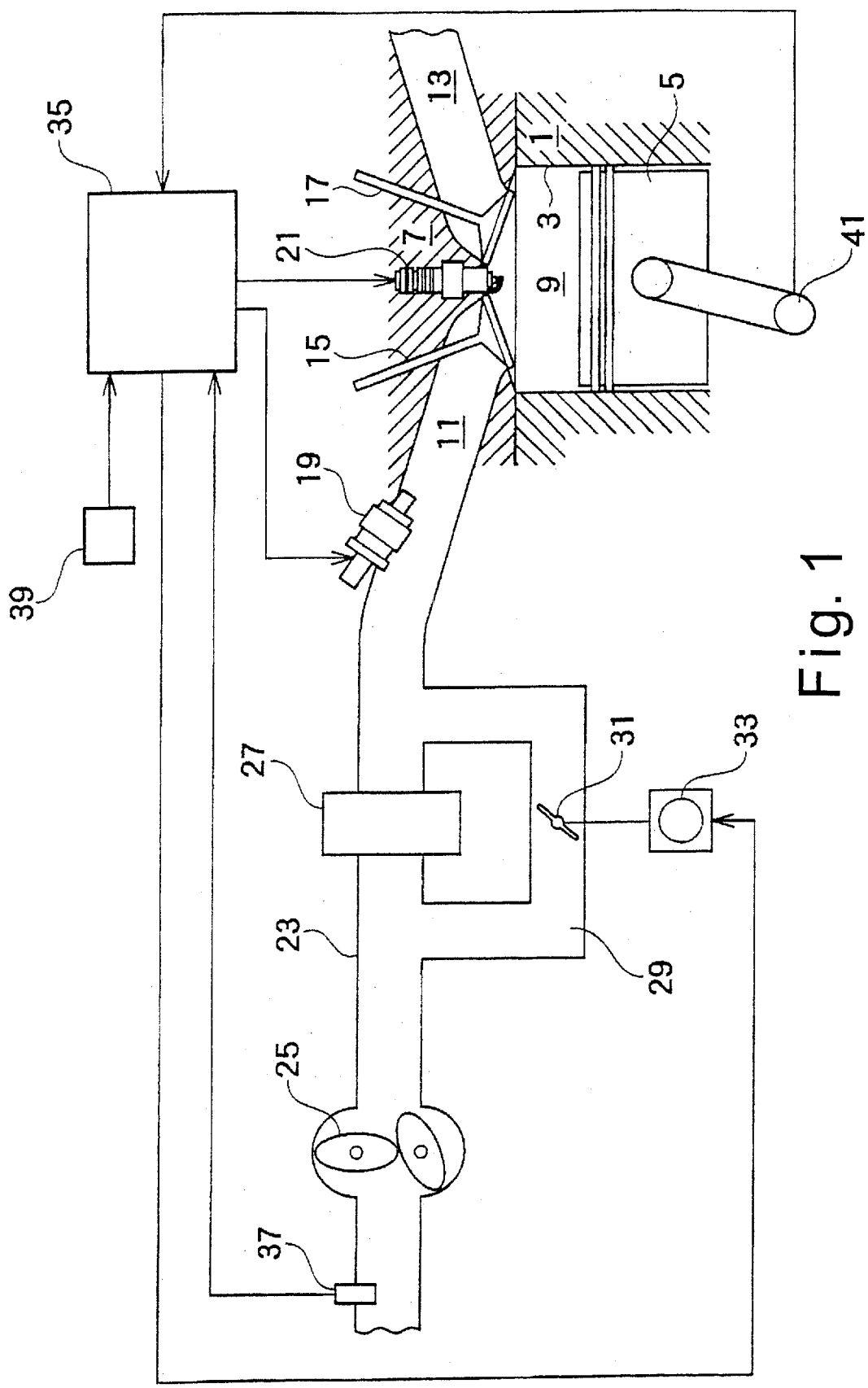
FIG. 1 is a schematic view of an overall configuration of a self-ignition type internal combustion engine in accordance with the first embodiment of the present invention.

Referring initially to FIG. 1, the overall configuration of a self-ignition type internal combustion engine is illustrated in accordance with a first embodiment of the present invention. The internal combustion engine has a cylinder block 1 with at least one piston 5 that is housed inside a cylinder 3, which is formed in a cylinder block 1. The piston 5 is slidably mounted in the cylinder 3 in such a manner that it can move up and down. A combustion chamber 9 is formed in the space between the cylinder 3, the piston 5 and the cylinder head 7. An intake port 11 and an exhaust port 13, which communicate with the combustion chamber 9, are formed in cylinder head 7. And an intake valve 15 and an exhaust valve 17 that open and close ports 11 and 13, respectively, are also provided.

A fuel injection valve 19 is installed in the intake port 11 and a spark plug 21 is installed in the approximate center of cylinder head 7 so as to face into the combustion chamber 9.

A supercharger 25 is installed in an intake passage 23, which fluidly communicates with the upstream end of the intake port 11. An inter-cooler 27 is installed downstream of the supercharger 25 and before the intake port 11. The inter-cooler 27 acts as a cooling device to cool the intake air after supercharging. A cooling bypass path or passage 29 that bypasses the inter-cooler 27 is connected to the intake passage 23. A cooling bypass flow rate adjusting valve 31 is provided in the bypass passage 29 as a flow rate adjusting device. The cooling bypass passage 29 and the cooling bypass flow rate adjusting valve 31 constitute a temperature control device that controls the temperature of the intake air entering the combustion chamber 9. More specifically, the cooling bypass passage 29 and the cooling bypass flow rate adjusting valve 31 increases the temperature of the intake air flowing into the combustion chamber 9. Thus, the intake air flowing into the combustion chamber is higher than the temperature of the intake air immediately downstream of the inter-cooler 27.

Figure 3:
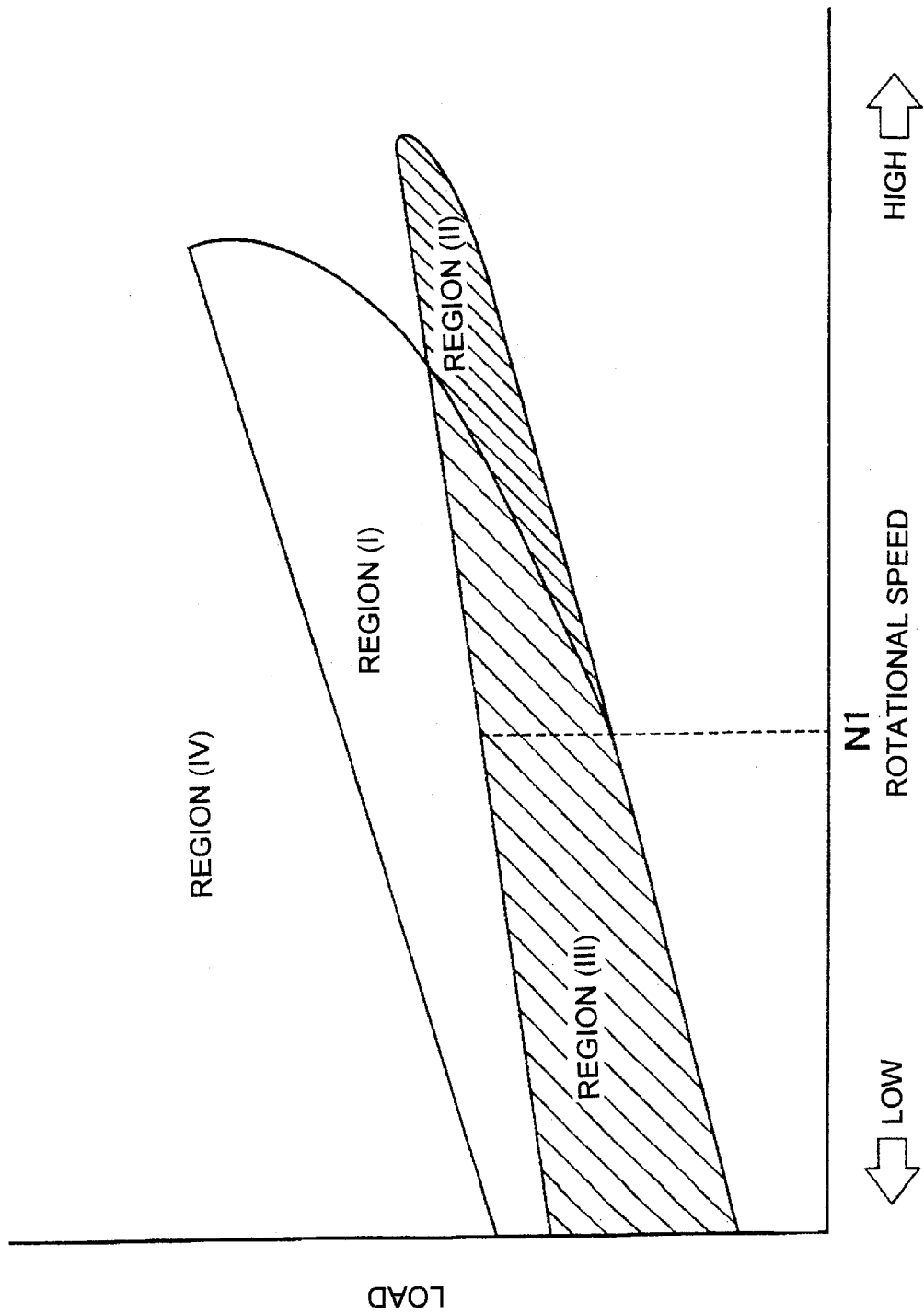
FIG. 3 is an operating region map stored in the electronic control unit of the self-ignition type internal combustion engine shown in FIG. 1.

An actuator 33 opens and closes the cooling bypass flow rate adjusting valve 31. The actuator is operated by an electronic control unit 35 based on various operational conditions that are inputted into the electronic control unit 35. The electronic control unit 35 preferably includes a microcomputer with a control program that controls the air flow as discussed below. The electronic control unit 35 can also include other conventional components such as an input interface circuit, an output interface circuit, and storage devices such as a ROM (Read Only Memory) device and a RAM (Random Access Memory) device. The memory circuit stores processing results and control programs such as ones for air flow control operations that are run by the processor circuit. The electronic control unit 35 is operatively coupled to the fuel injection valve 19 and the spark-plug 21 in a conventional manner. The internal RAM of the electronic control unit 35 stores statuses of operational flags and various control data. The internal ROM of the electronic control unit 35 stores various operations and/or parameters, such as the operating map shown in FIG. 3, to carry out the control program. The electronic control unit 35 is capable of selectively controlling any of the components of the self-ignition type internal combustion engine in accordance with the control program. It will be apparent to those skilled in the art from this disclosure that the precise structure and algorithms for electronic control unit 35 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The electronic control unit 35 receives an intake air amount signal from an air flow meter 37 provided upstream of the supercharger 25, a load signal from an accelerator position sensor 39 and an engine rotational speed signal from a crank angle sensor 41. Based on these input signals, the electronic control unit 35 outputs a drive control signal to control the actuator 33, the fuel injection valve 19 and the spark plug 21.

The fuel injection valve 19 injects fuel when the intake valve 15 is closed, i.e., when the engine is not performing the intake stroke. The injected fuel is directed so as to strike directly against the head part of the intake valve 15. The intake valve 15 is thoroughly heated by the heat from inside the combustion chamber 9 to promote vaporization of the fuel. It is also acceptable for the fuel injection valve 19 to be installed in a position such that it injects the fuel directly into the combustion chamber 9.

Figure 2:
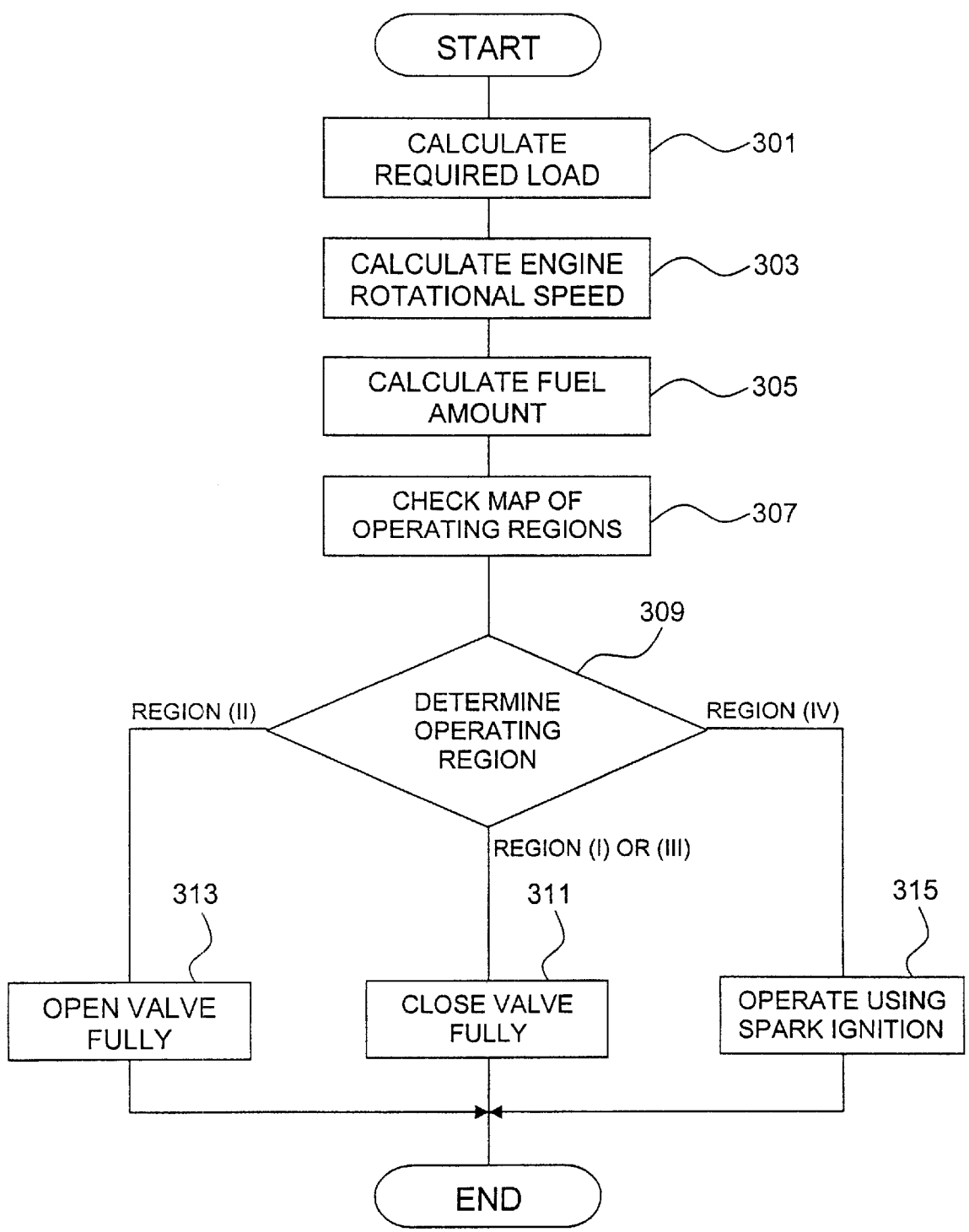
FIG. 2 is a flowchart showing control operations of an electronic control unit used the self-ignition type internal combustion engine shown in FIG. 1.

Next, the operation of the self-ignition type internal combustion engine will be explained based on the control operations of the electronic control unit 35, which are shown in FIG. 2. During the intake stroke, in which the intake valve 15 opens and fresh intake air enters the combustion chamber 9, the fuel injected by the fuel injection valve 19 mixes well with the fresh intake air and spreads throughout the entire combustion chamber 9. Then, in the compression stroke, the air-fuel mixture inside the combustion chamber 9 is compression heated by the rising of the piston 5, and then the air-fuel mixture reaches self-ignition if the proper operational conditions are present. At this point in time, the electronic control unit 35 receives an output signal from the accelerator position sensor 39 and calculates the required load (step 301). The electronic control unit 35 also receives an output signal from the crank angle sensor 41 and calculates the engine rotational speed (step 303).

Furthermore, the electronic control unit 35 receives an output signal from the air flow meter 37 to calculate the intake air amount. Then, based on the calculated intake air amount, the electronic control unit 35 calculates a fuel amount that matches to the required load (step 305). By comparing the calculated required load and the engine rotational speed to an operating region map (shown in FIG. 3) pre-stored therein, the electronic control unit 35 determines if the current operating region is in region (I), region (II), region (III) or region (IV) (step 309). Here, region (I), region (II), and region (III) are self-ignition combustion regions, while region (IV) is a spark ignition combustion region in which the air-fuel mixture is ignited by utilizing the spark plug 21.

When the current operating region is determined to be region (I) or (III), the cooling bypass flow rate adjusting valve 31 is closed completely (step 311) and all of the intake air that has passed through the supercharger 25 is passed through and cooled by the inter-cooler 27. The reason for this is that region (I) is a region in which the engine simply cannot operate unless the intake air is cooled. Region (III), on the other hand, is a region in which it is necessary to cool the intake air when operating at low engine rotational speeds where knocking occurs easily.

Meanwhile, when the current operating region is determined to be region (II), the cooling bypass flow rate adjusting valve 31 is opened completely (step 313) such that almost all of the supercharged intake air passes through the bypass passage 29 so as to perform temperature control that prevents over cooling of the intake air. This is done because region (II) is a region in which the temperature of the intake air will be too low and self-ignition combustion operation will not be possible if the intake air is cooled.

When the current operating region is determined to be in region (IV), which is outside regions (I), (II) and (III), the operation method is changed from self-ignition combustion to spark ignition combustion using the spark plug 21 (step 315). Thus, depending on the operating region, over cooling of the intake air can be avoided by not passing the post-supercharging intake air through the inter-cooler 27. As a-result, self-ignition operation can be conducted even in regions where the temperature of the intake air will be too low and operation will be impossible if the intake air is cooled. Moreover, the operating load range in which high-efficiency, low-emission compression self-ignition operation is possible can be expanded.

Second Embodiment

Figure 4:
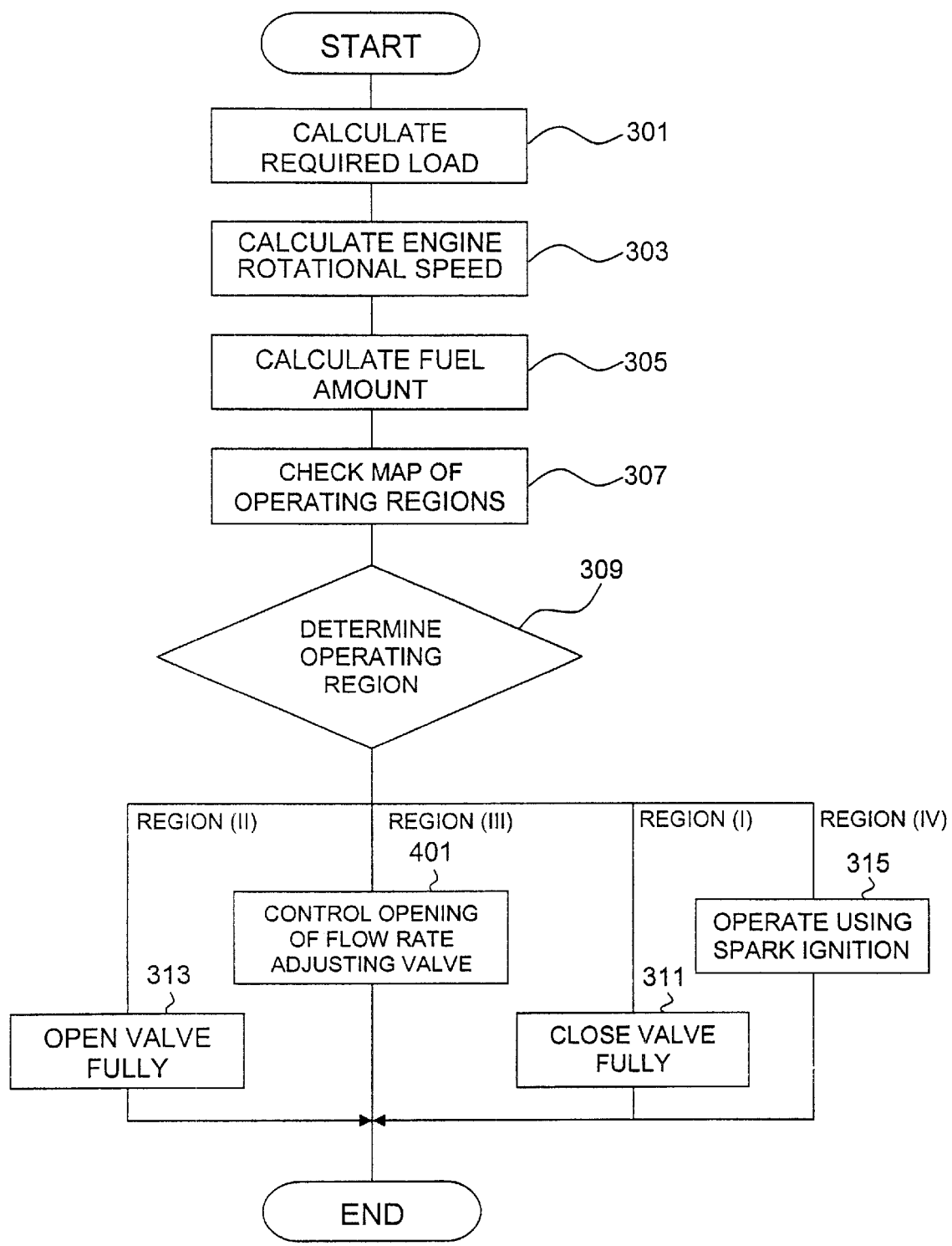
FIG. 4 is a flowchart showing control operations of an electronic control unit used in a self-ignition type internal combustion engine in accordance with a second embodiment of the present invention.
Figure 5:
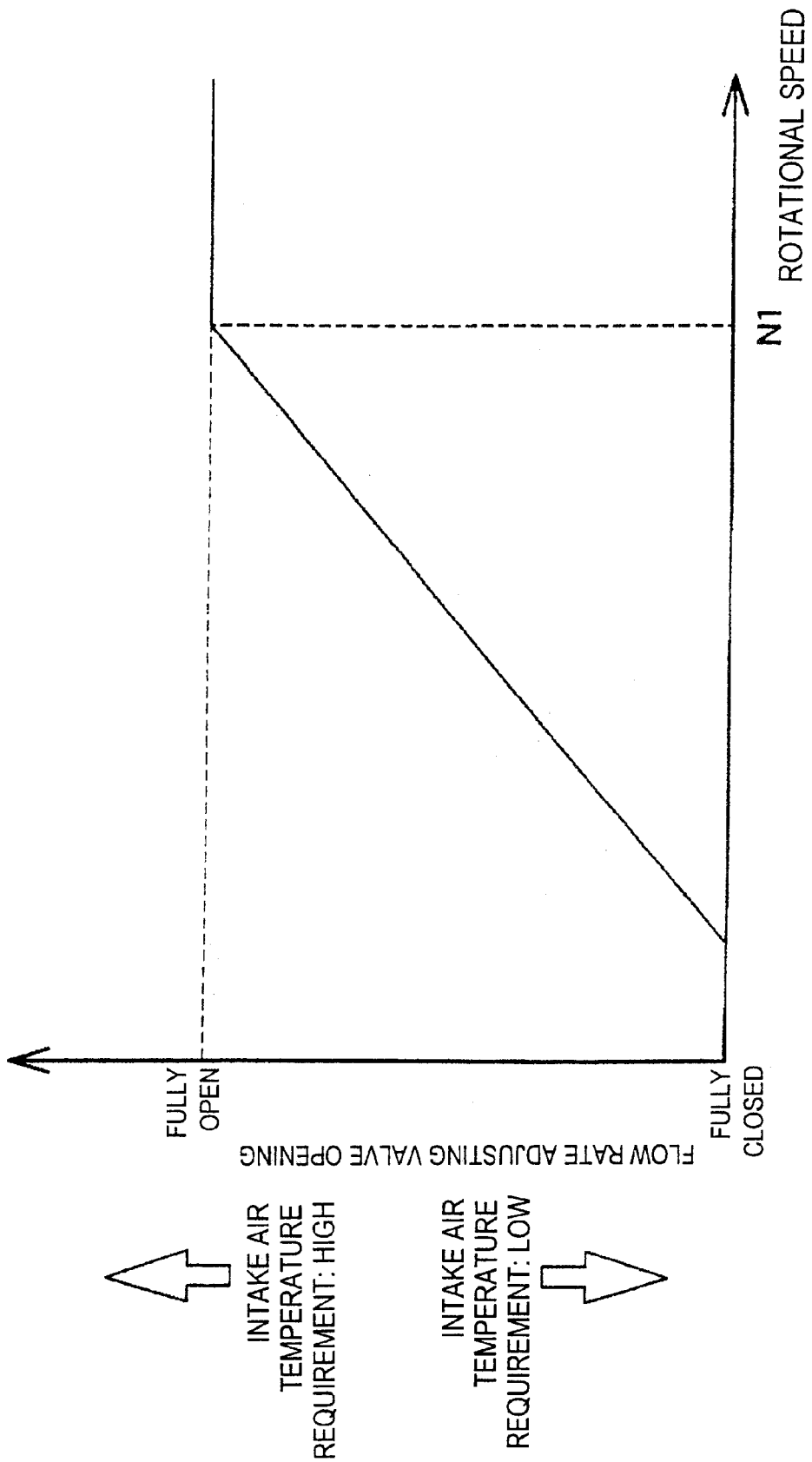
FIG. 5 is a map showing relationship between the engine rotational speed and the opening of the flow rate adjusting valve that is stored in an electronic control unit of the self-ignition type internal combustion engine using the flowchart illustrated in FIG. 4.

Referring now to FIGS. 4 and 5, a control program in accordance with a second embodiment will now be explained. Basically, the control program of this second embodiment uses the self-ignition internal combustion engine illustrated in FIG. 1 and the operating map illustrated in FIG. 3. In view of the similarity between the first and second embodiments, the parts or steps of the second embodiment that are identical to the parts or steps of the first embodiment will be given the same reference numerals as the parts or steps of the first embodiment. Moreover, the descriptions of the parts or steps of the second embodiment that are identical to the parts or steps of the first embodiment may be omitted for the sake of brevity.

Referring now to FIG. 4, a flowchart is illustrated that shows the control operations of the electronic control unit 35 used in the second embodiment of the present invention. These control operations are the same as for the first embodiment up to step 309 of the flowchart in FIG. 2, i.e., up to the operation where it is determined which of the regions (i.e., regions (I), (II), (III) and (VI)) shown in FIG. 3 corresponds to the current operating region.

The control executed based on the current operating region determined in step 309 is the same as that executed in the first embodiment for three of the operating regions, i.e., regions (I), (II) and (IV). In other words, in region (I), the cooling bypass flow rate adjusting valve 31 is closed fully (step 311). In region (II), the cooling bypass flow rate adjusting valve 31 is opened fully (step 313). In region (IV), spark ignition combustion is used (step 315).

However, when the operating region is determined region (III), the opening of the cooling bypass flow rate adjusting valve 31 is adjusted (step 401) based on a control map (shown in FIG. 5). The control map of FIG. 5 plots the engine rotational speed versus the opening of the cooling bypass flow rate adjusting valve 31 when the engine rotational speed is less than or equal to a predetermined rotational speed N1. The control map is stored in advance in the electronic control unit 35. More specifically, since it is necessary to increase the temperature of the intake air as the rotational speed of the engine becomes faster, the opening of the cooling bypass flow rate adjusting valve 31 is enlarged and the amount of intake air directed to the bypass passage 29 is increased. As a result, in operating regions where there is the risk that knocking will occur if the intake air is not cooled, particularly low rotational speed regions, excessive cooling of the intake air can be avoided while maintaining a somewhat high temperature. Moreover, it is possible to conduct compression self-ignition combustion for which the occurrence of unburned fuel is suppressed.

Third Embodiment

Referring now to FIGS. 6–12, a self-ignition internal combustion engine is illustrated in accordance with a third embodiment. In view of the similarity between the first and third embodiments, the parts or steps of the third embodiment that are identical to the parts or steps of the first embodiment will be given the same reference numerals as the parts of the first embodiment. Moreover, the descriptions of the parts or steps of the third embodiment that are identical to the parts or steps of the first embodiment may be omitted for the sake of brevity.

Figure 6:
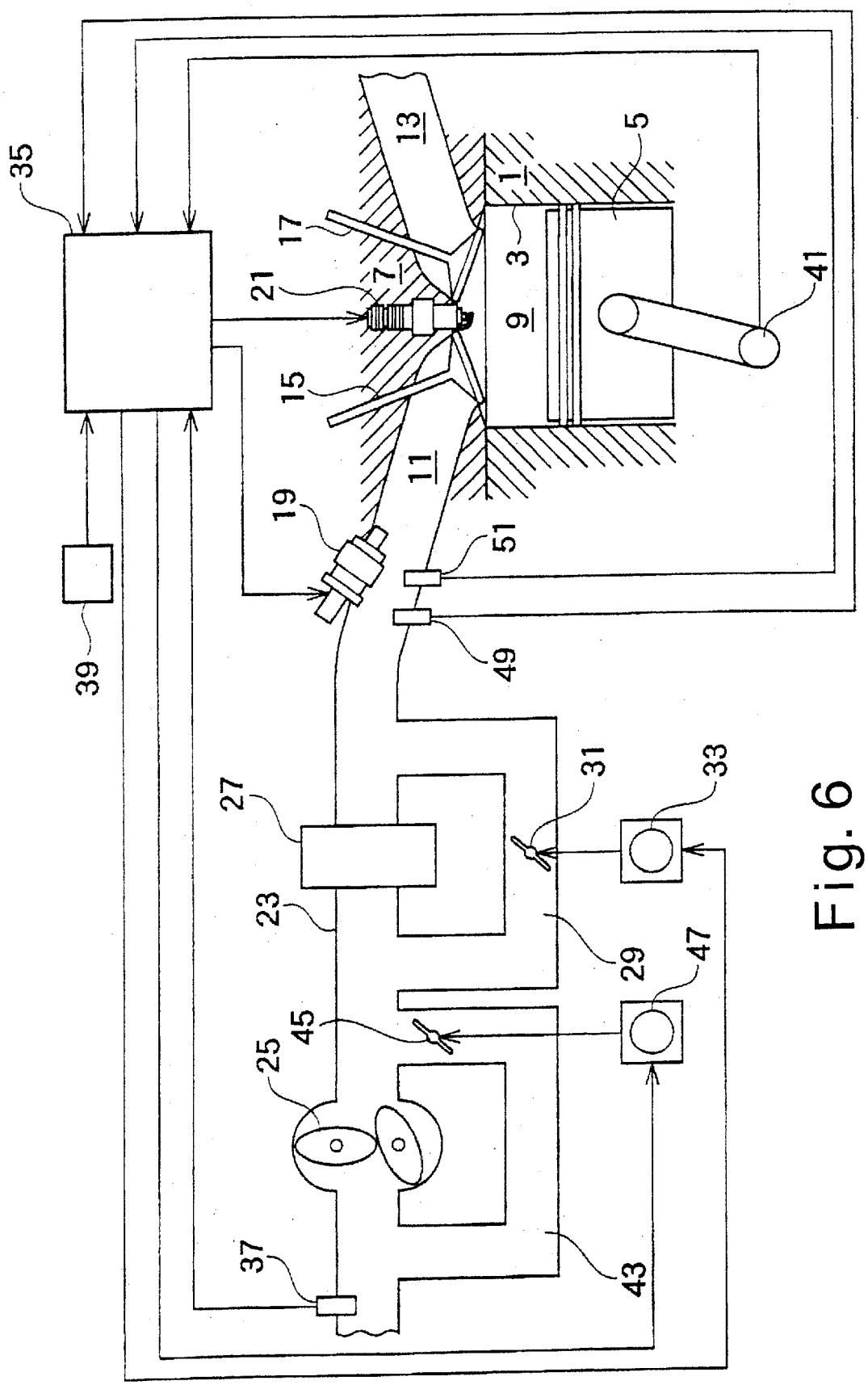
FIG. 6 is a schematic view of an overall configuration of a self-ignition type internal combustion engine in accordance with a third embodiment of the present invention.

FIG. 6 shows the overall configuration of a compression self-ignition type internal combustion engine in accordance with a third embodiment of the present invention. In this embodiment, a supercharger bypass feature has been added to the configuration shown in FIG. 1. In particular, the supercharger bypass feature includes a supercharger bypass passage 43, a supercharger pressure adjusting valve 45, a supercharger pressure control actuator 47, an intake temperature sensor 49 and a supercharger pressure sensor 51. The supercharger bypass passage 43 is arranged to have the intake air bypass the supercharger 25. The supercharging pressure adjusting valve 45 is arranged to open and close the supercharger bypass passage 43 and serves as a supercharger bypass flow rate adjusting device that adjusts the bypass flow rate. The supercharging pressure control actuator 47 is configured to drive the opening and closing of the supercharging pressure adjusting valve 45, and is controlled by the electronic control unit 35. The intake temperature sensor 49 and the supercharging pressure sensor 51 are installed in the intake port 11 to produce detection signals that are fed to the electronic control unit 35.

Figure 7:
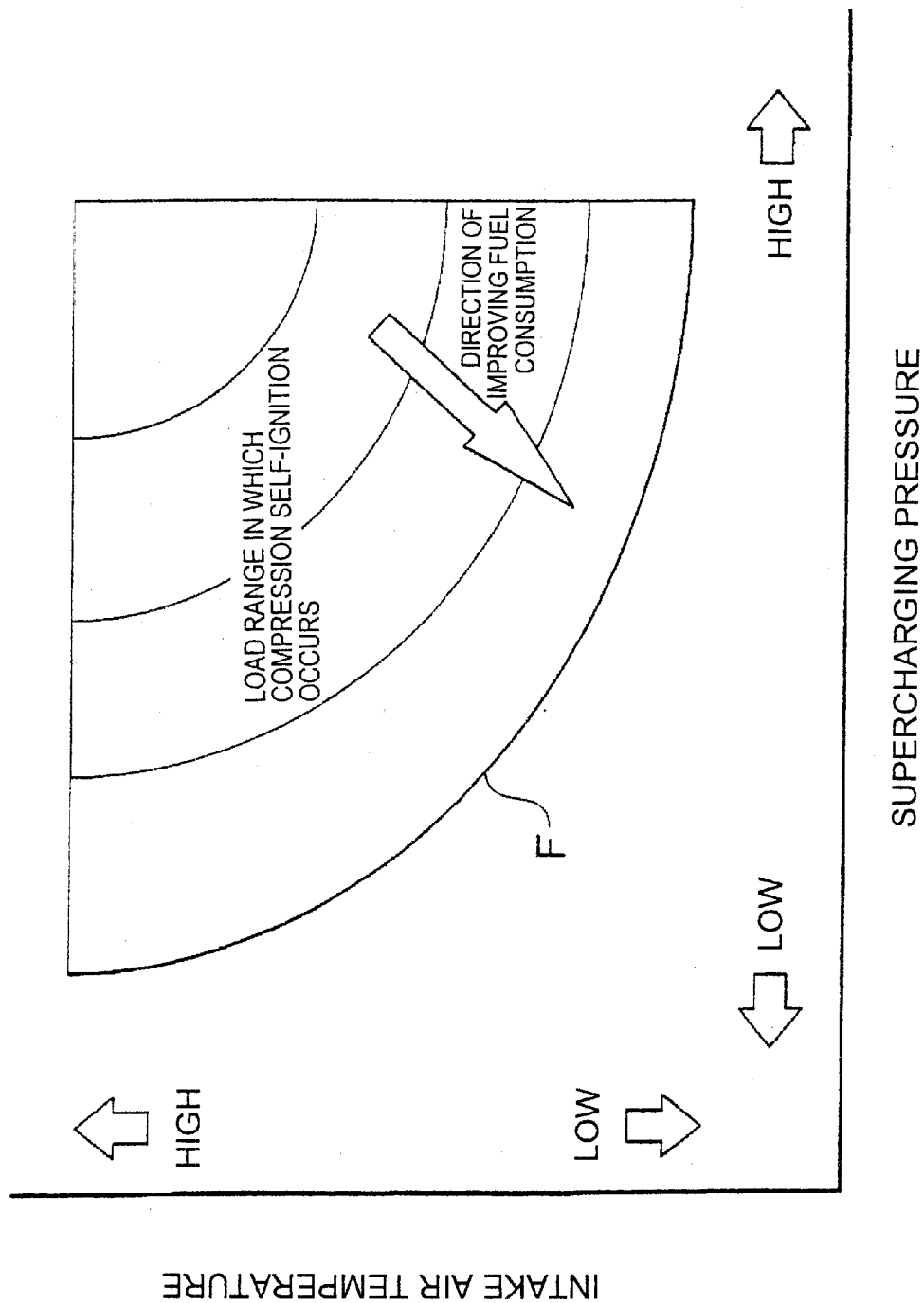
FIG. 7 is an explanatory graph showing the range in which self-ignition combustion is possible depending on the combination of supercharging pressure and intake air temperature at a given load.
Figure 8:
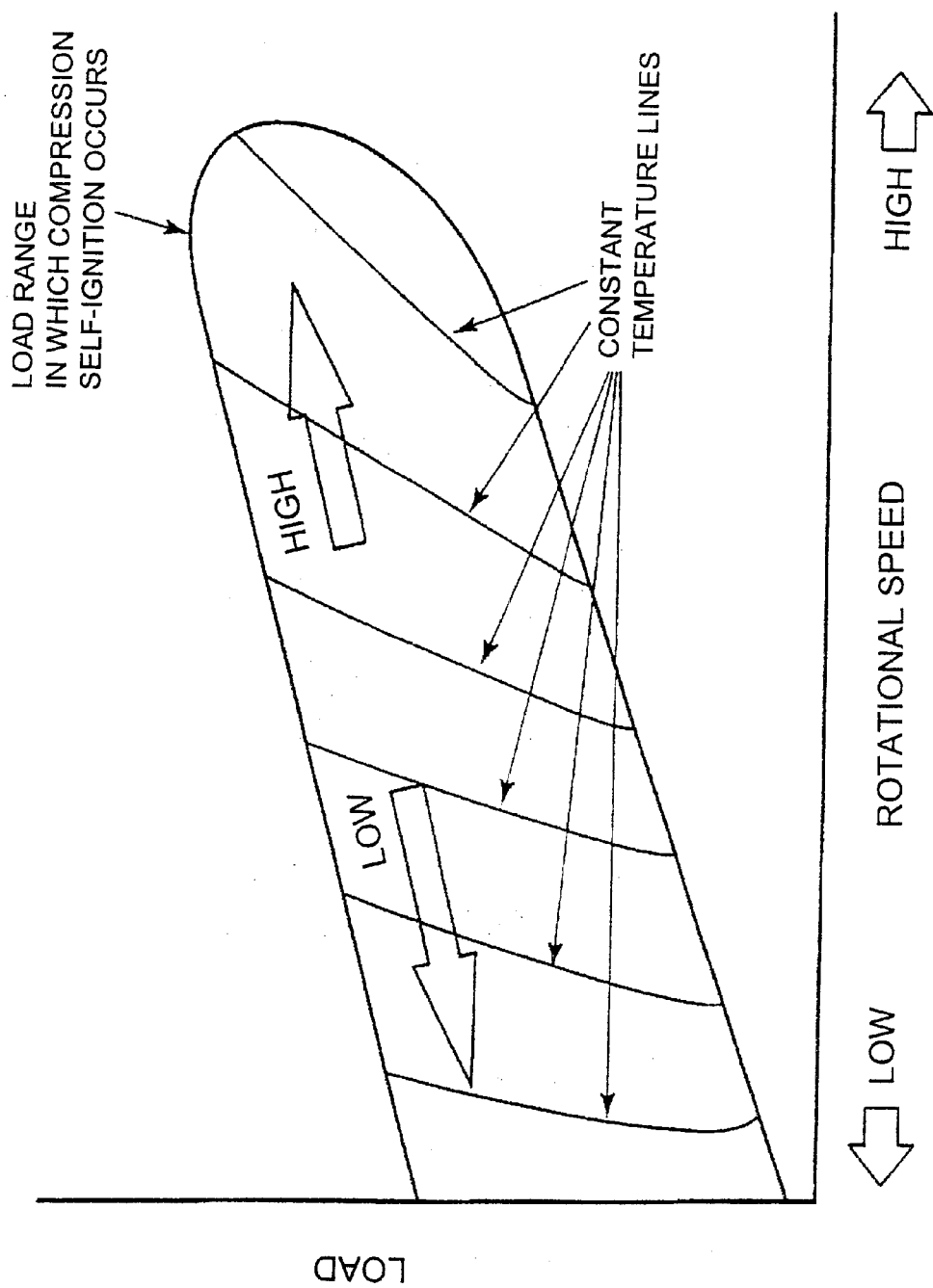
FIG. 8 is a graph of constant temperature lines showing the combinations from FIG. 7 for which the fuel consumption rate is best on a plot of the engine load versus the engine rotational speed.
Figure 9:
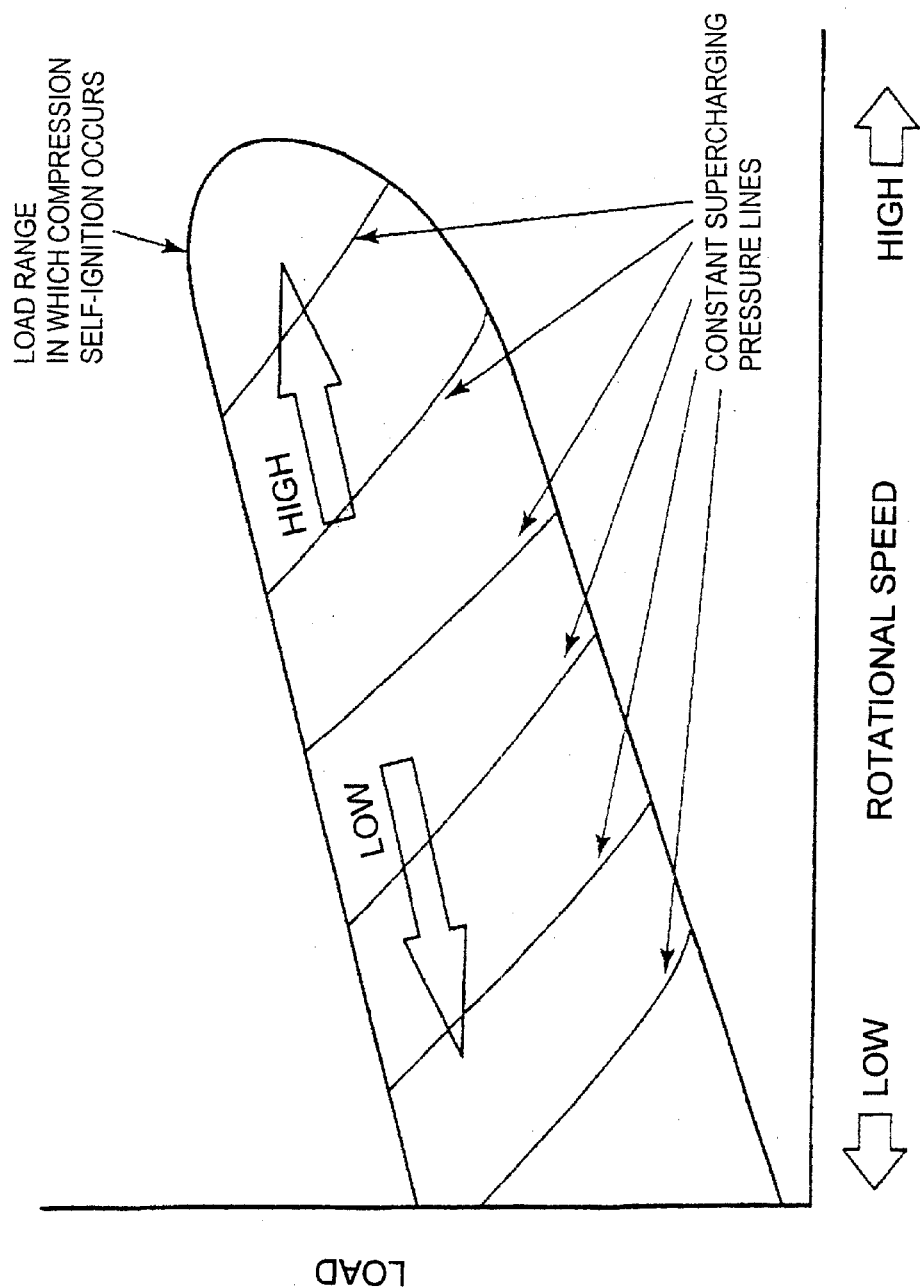
FIG. 9 is a graph of constant pressure lines showing the combinations from FIG. 7 for which the fuel consumption rate is best on a plot of the engine load versus the engine rotational speed.

The range in which compression self-ignition combustion is possible depends upon the relationship of the supercharging pressure and the intake air temperature at a given load as shown in FIG. 7. In the range where compression self-ignition combustion is possible, the fuel efficiency improves as the supercharging pressure and intake air temperature decrease. As seen in FIGS. 8 and 9, the combinations (indicated as curve F of FIG. 7) of the intake air temperature and the supercharging pressure for the best fuel efficiency is shown as constant temperature lines and constant supercharging pressure lines on a plot of the engine load versus the engine rotational speed. The third embodiment is an arrangement in which the aforementioned combinations of intake temperatures and supercharging pressures are optimized.

Figure 10:
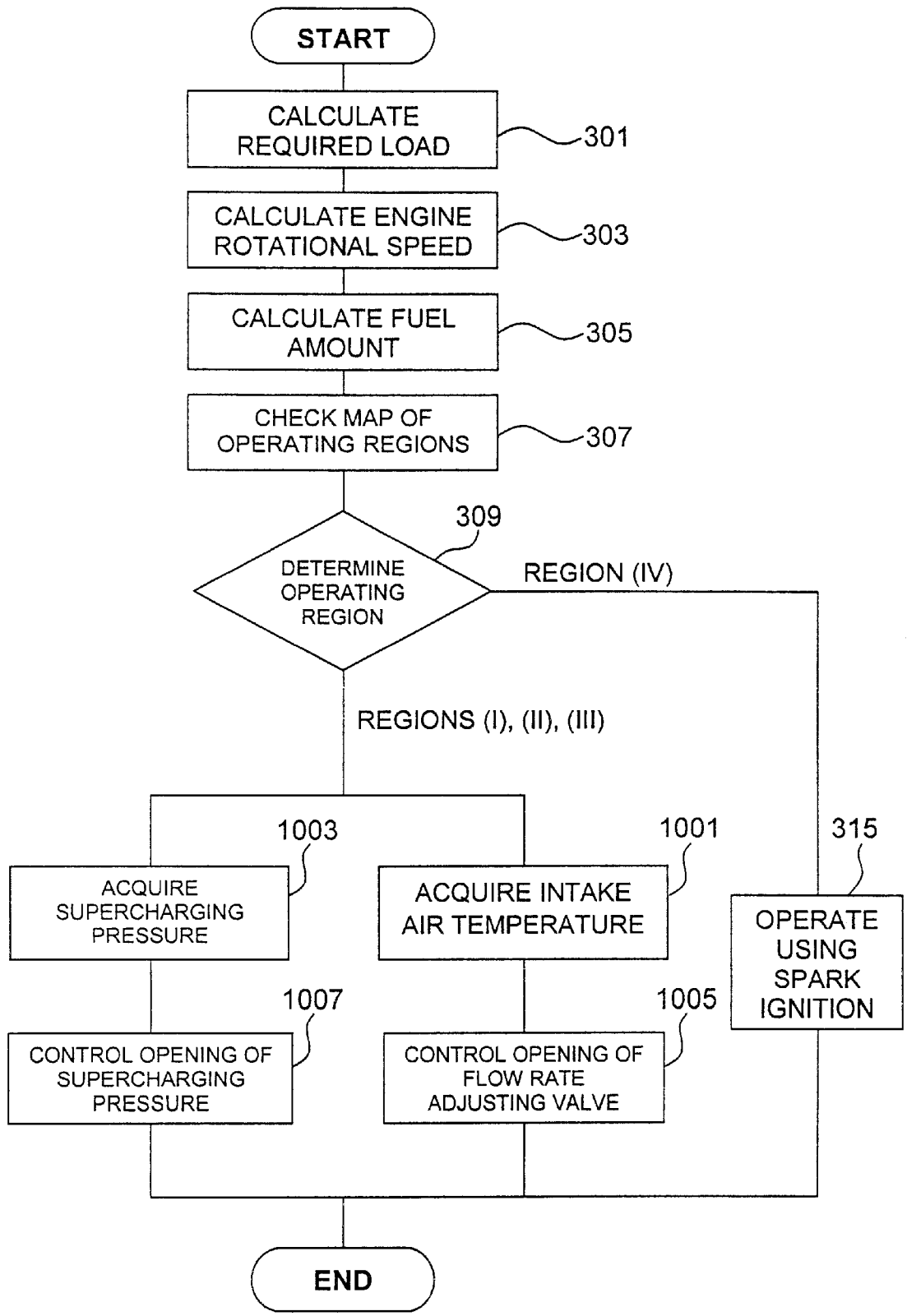
FIG. 10 is a flowchart showing control operations of an electronic control unit used in a self-ignition type internal combustion engine in accordance with a third embodiment of the present invention.

FIG. 10 is a flowchart showing the control operations of the electronic control unit 35 of the third embodiment. These control operations are the same as for the first embodiment up to step 309 of the flowchart in FIG. 2, i.e., up to the operation of step 309 where it is determined which of the regions (i.e., regions (I), (II), (III) and (VI)) shown in FIG. 3 corresponds to the current operating region. Here, as in the first embodiment, spark ignition combustion is conducted (step 315) when the current operating region is region (IV).

When the current operating region is one of regions (I), (II) and (III), i.e., a region of self-ignition combustion, the electronic control unit 35 acquires the intake air temperature detected by the intake air temperature sensor 49 (step 1001) and the supercharging pressure detected by the supercharging pressure sensor 51 (step 1003).

Figure 11:
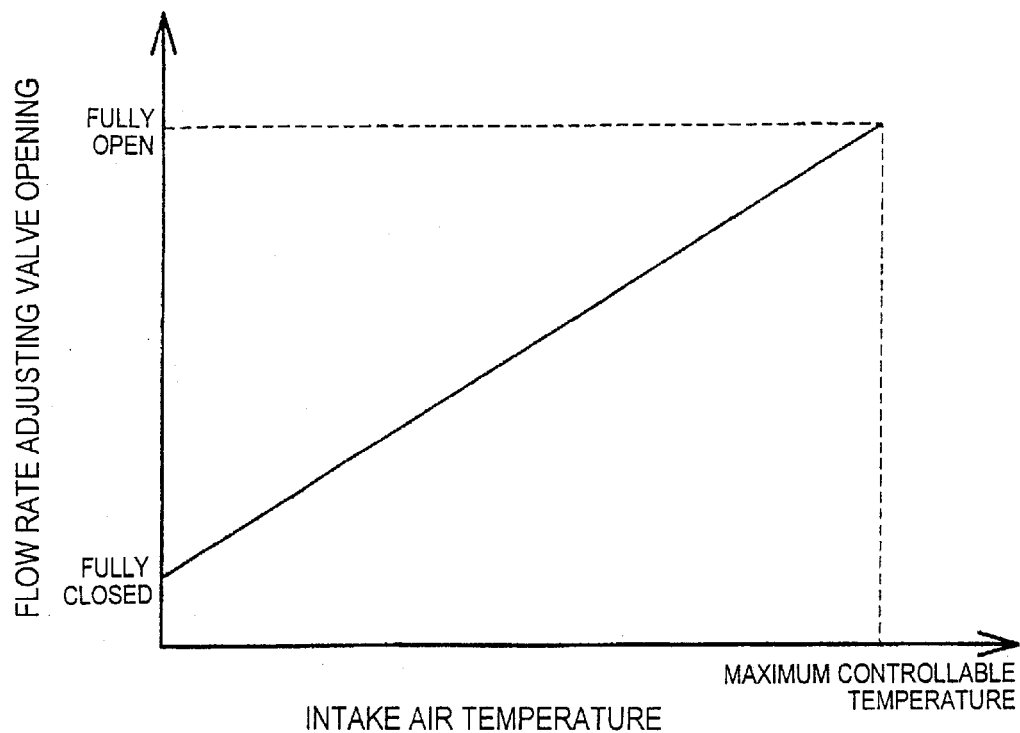
FIG. 11 is a graph that shows the correlation between the intake air temperature and flow rate adjusting valve opening corresponding to FIG. 8.

By acquiring the intake air temperature, the opening of the cooling bypass flow rate adjusting valve 31 is controlled (step 1005) such that the intake air temperature corresponds to the temperature map shown in FIG. 8. The temperature map of FIG. 8 is correlated with respect to the engine rotational speed and engine load, and is stored in advance in the electronic control unit 35. For example, since knocking will occur, the intake air temperature is set to a low temperature when the operating region is within the self-ignition range with a high load and a low rotational speed. Meanwhile, when the engine is in a region where the rotational speed is high but the load is not very high, it is necessary to have a high intake air temperature to ensure operation by compression self-ignition combustion. Therefore, the temperature is controlled along a constant temperature line of the temperature map shown in FIG. 8. Here, as the required intake air temperature increases, the opening of the flow rate adjusting valve 31 increases, as shown in FIG. 11, and the amount of intake air that flows through the inter-cooler 27 is reduced.

Figure 12:
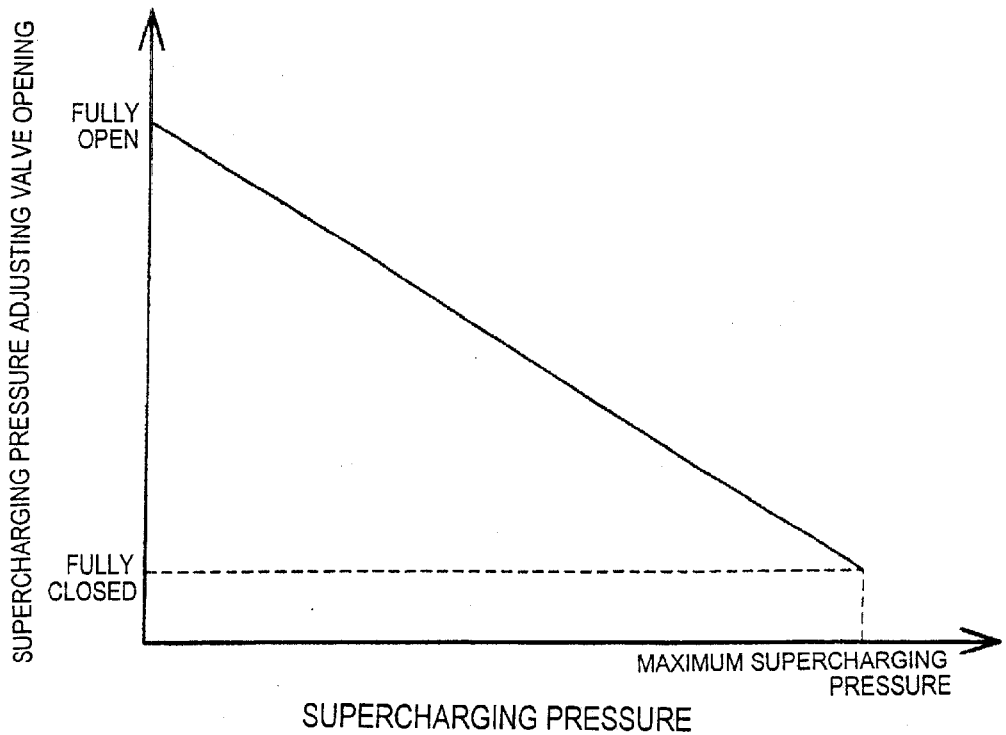
FIG. 12 is a graph that shows the correlation between the supercharging pressure and supercharging pressure adjusting valve opening corresponding to FIG. 9.

By acquiring the supercharging pressure, the opening of the supercharging pressure adjusting valve 45 is controlled (step 1007) such that the supercharging pressure corresponds to the supercharging pressure map shown in FIG. 9. The supercharging pressure map of FIG. 9 is correlated with respect to the engine rotational speed and engine load, and is stored in advance in the electronic control unit 35. More specifically, the supercharging pressure increased in regions where the engine rotational speed and load are both high. Meanwhile, in regions where the engine rotational speed and load are both low, it is necessary to establish a low supercharging pressure in order to reduce the supercharging work. Therefore, the supercharging pressure is controlled along a constant pressure line of the supercharging pressure map shown in FIG. 9. Here, as the required supercharging pressure increases, the opening of the supercharging pressure adjusting valve 45 decreases, as shown in FIG. 12, and the amount of intake air that flows through the supercharger 25 is increased.

Thus, with the third embodiment, the fuel efficiency can be increased and the operating load range of compression self-ignition combustion can be expanded by optimally controlling the intake air temperature and supercharging pressure in response to the operating conditions based on the best combination of the intake air temperature and supercharging pressure in view of the fuel consumption rate.

Fourth Embodiment

Referring now to FIGS. 13–17, a self-ignition internal combustion engine is illustrated in accordance with a fourth embodiment. In view of the similarity between the fourth embodiment and the prior embodiments, the parts or steps of the fourth embodiment that are identical to the parts or steps of the prior embodiments will be given the same reference numerals as the parts of the prior embodiments. Moreover, the descriptions of the parts or steps of the fourth embodiment that are identical to the parts or steps of the prior embodiments may be omitted for the sake of brevity.

Figure 13:
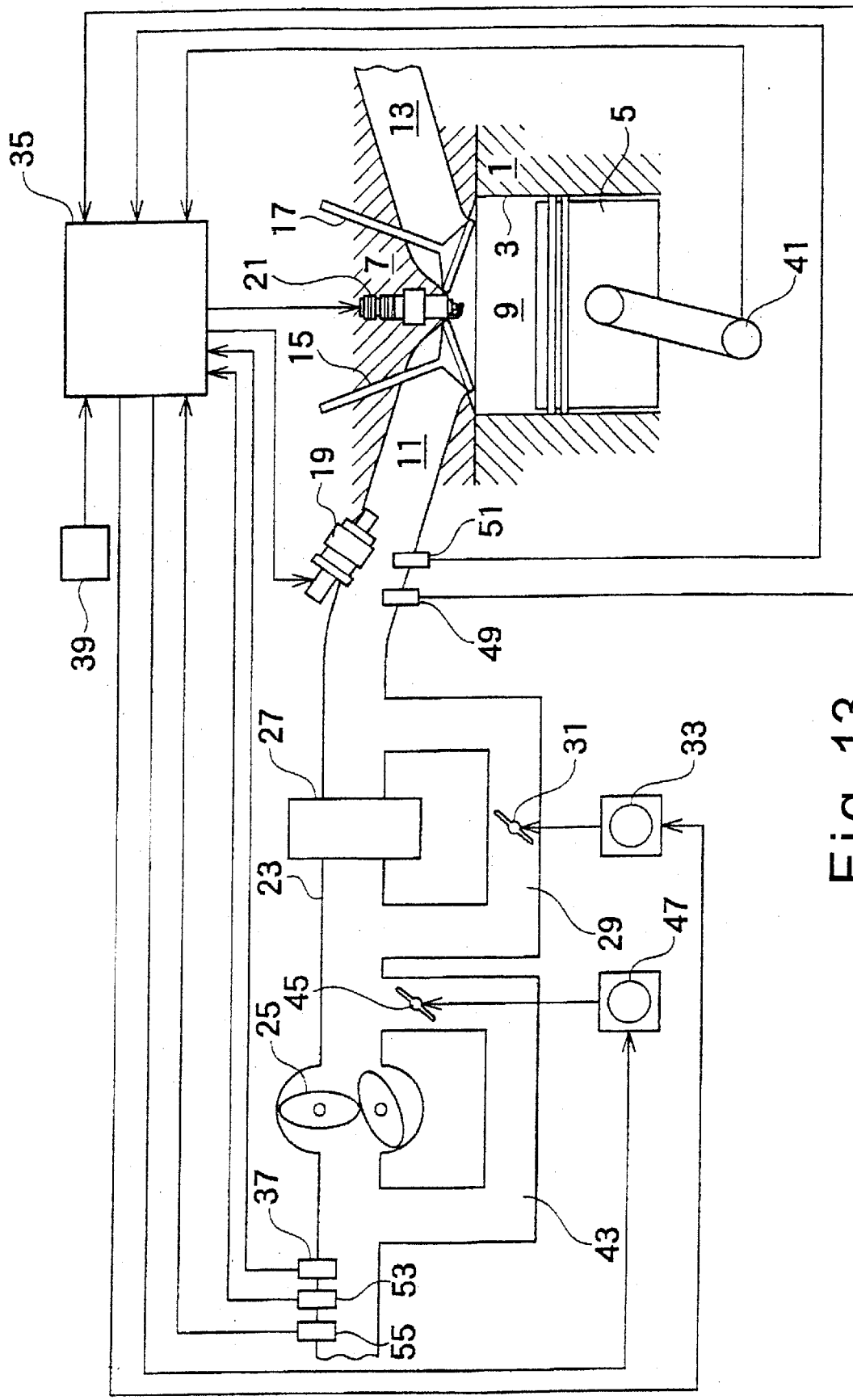
FIG. 13 is a schematic view of an overall configuration of a self-ignition type internal combustion engine in accordance with a fourth embodiment of the present invention.
Figure 14:
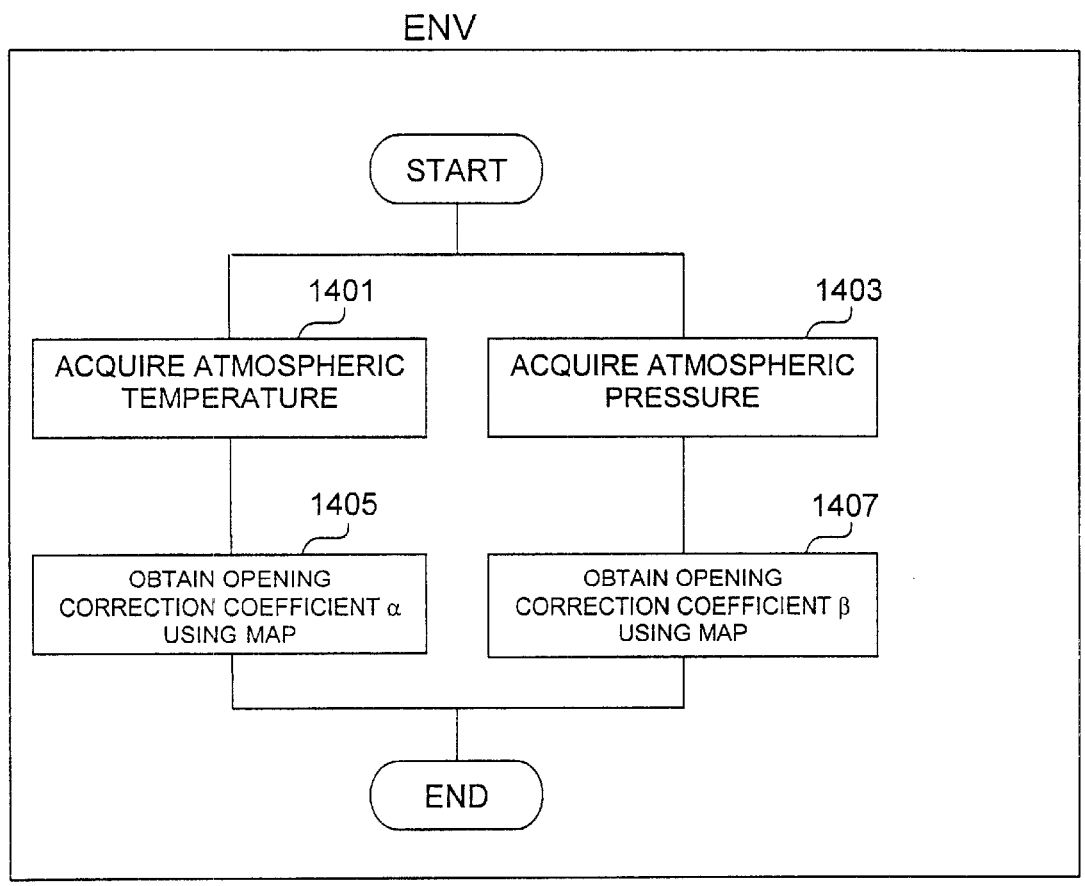
FIG. 14 is a flowchart showing control operations by which an electronic control unit of the fourth embodiment determines the valve opening correction coefficients.

FIG. 13 shows the overall configuration of a compression self-ignition type internal combustion engine in accordance with a fourth embodiment of the present invention. The fourth embodiment is basically the same as the third embodiment, except that additional sensors are used to further optimize the intake temperature and supercharging pressure as explained below. Adding to the configuration of the third embodiment shown in FIG. 6, this embodiment has an atmospheric temperature sensor 53 and an atmospheric pressure sensor 55 installed adjacent to the air flow meter 37 in the intake passage 23. As shown in FIG. 14, the electronic control unit 35 acquires the detection values for the current atmospheric temperature and the current atmospheric pressure from the atmospheric temperature sensor 53 and the atmospheric pressure sensor 55 (step 1401 and step 1403, respectively). The electronic control unit 35 uses the values to obtain an atmospheric temperature-based opening correction coefficient $\alpha$ for the cooling bypass flow rate adjusting valve 31 (step 1405) using a temperature correction map (shown in FIG. 15) that is stored in advance in the electronic control unit 35 and an atmospheric pressure-based opening correction coefficient $\beta$ for the supercharging pressure adjusting valve 45 (step 1407) using a pressure correction map (shown in FIG. 16) that is stored in advance in the electronic control unit 35.

Figure 15:
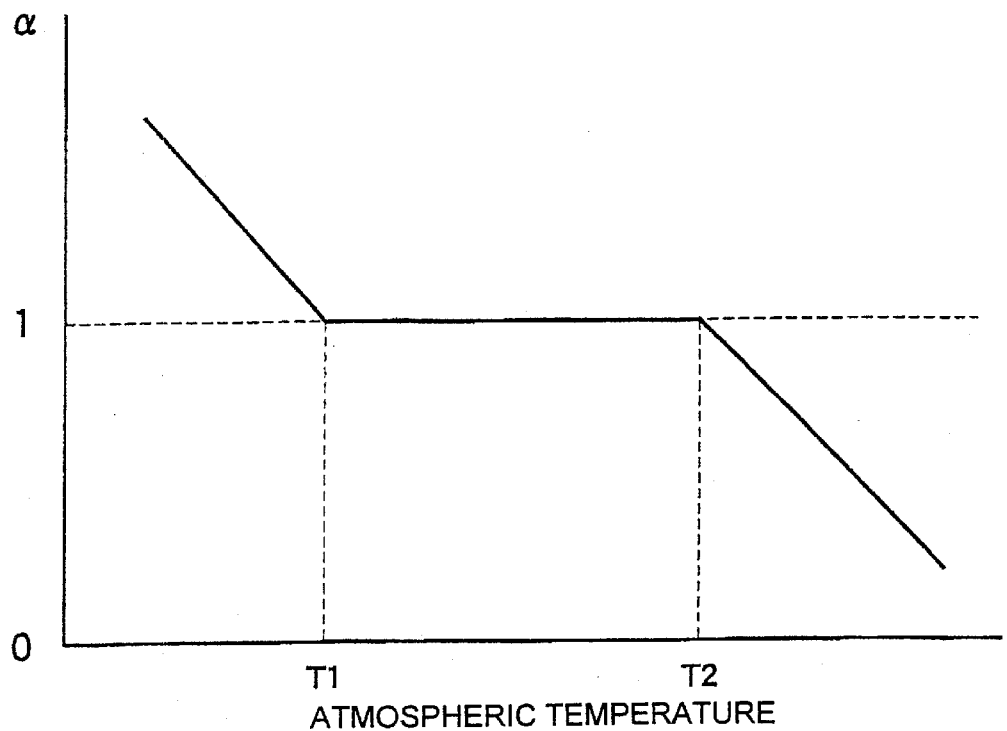
FIG. 15 is a graph that shows the correlation between the atmospheric temperature and the opening correction coefficient for the flow rate adjusting valve.

As seen in FIG. 15, when the atmospheric temperature is less than or equal to a predetermined temperature T1 (e.g., 0° C.), the intake air temperature becomes too low. Therefore, the opening correction coefficient $\alpha$ is a value larger than 1 ($\alpha$>1). Also, the opening of the cooling bypass flow rate adjusting valve 31 is corrected to be larger, so that the intake air temperature is corrected to a higher temperature. Meanwhile, when the atmospheric temperature is greater than or equal to a predetermined temperature T2 (e.g., 40° C.), the intake air temperature becomes too high. Therefore, opening correction coefficient $\alpha$ is a value smaller than 1 ($0<\alpha<1$). Also, the opening of the flow rate adjusting valve 31 is corrected to be smaller such that the intake air temperature is corrected to a lower temperature.

Figure 16:
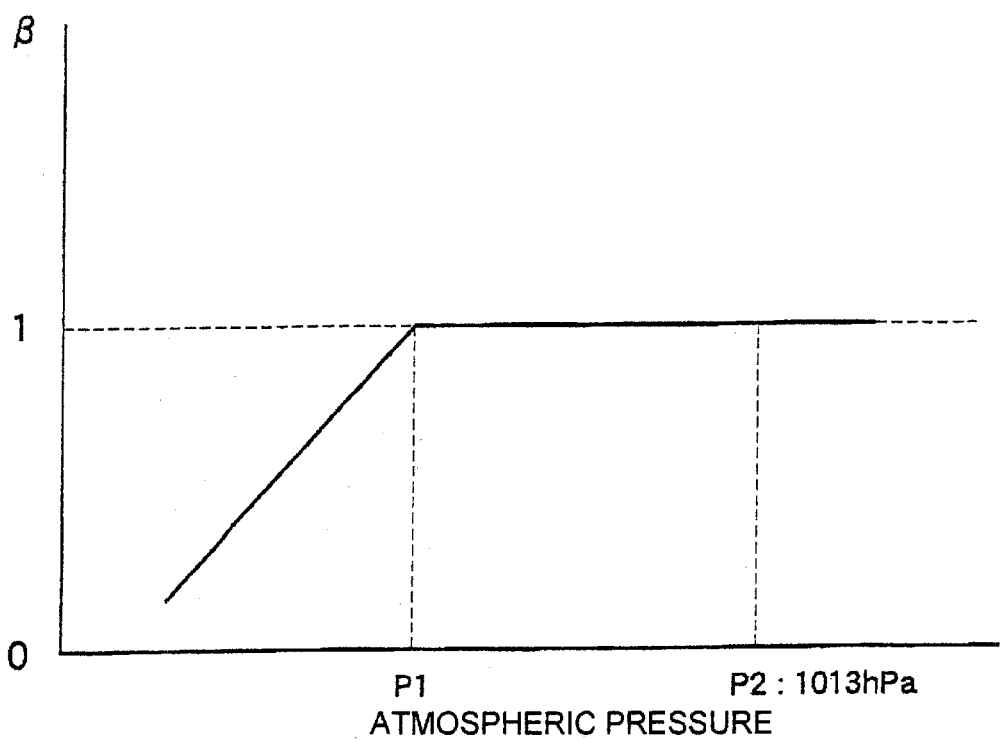
FIG. 16 is a graph that shows the correlation between the atmospheric pressure and the opening correction coefficient for the supercharging pressure adjusting valve.

Also, in FIG. 16, when the atmospheric pressure is less than or equal to a predetermined pressure P1 (e.g., 970 hPa), the supercharging pressure becomes too low. Therefore, the opening correction coefficient $\beta$ is a value less than 1 ($\beta$<1). Also, the opening of the supercharging pressure adjusting valve 45 is corrected to be smaller such that the supercharging pressure is corrected to a higher pressure. The opening is not corrected when the atmospheric pressure exceeds P1.

Figure 17:
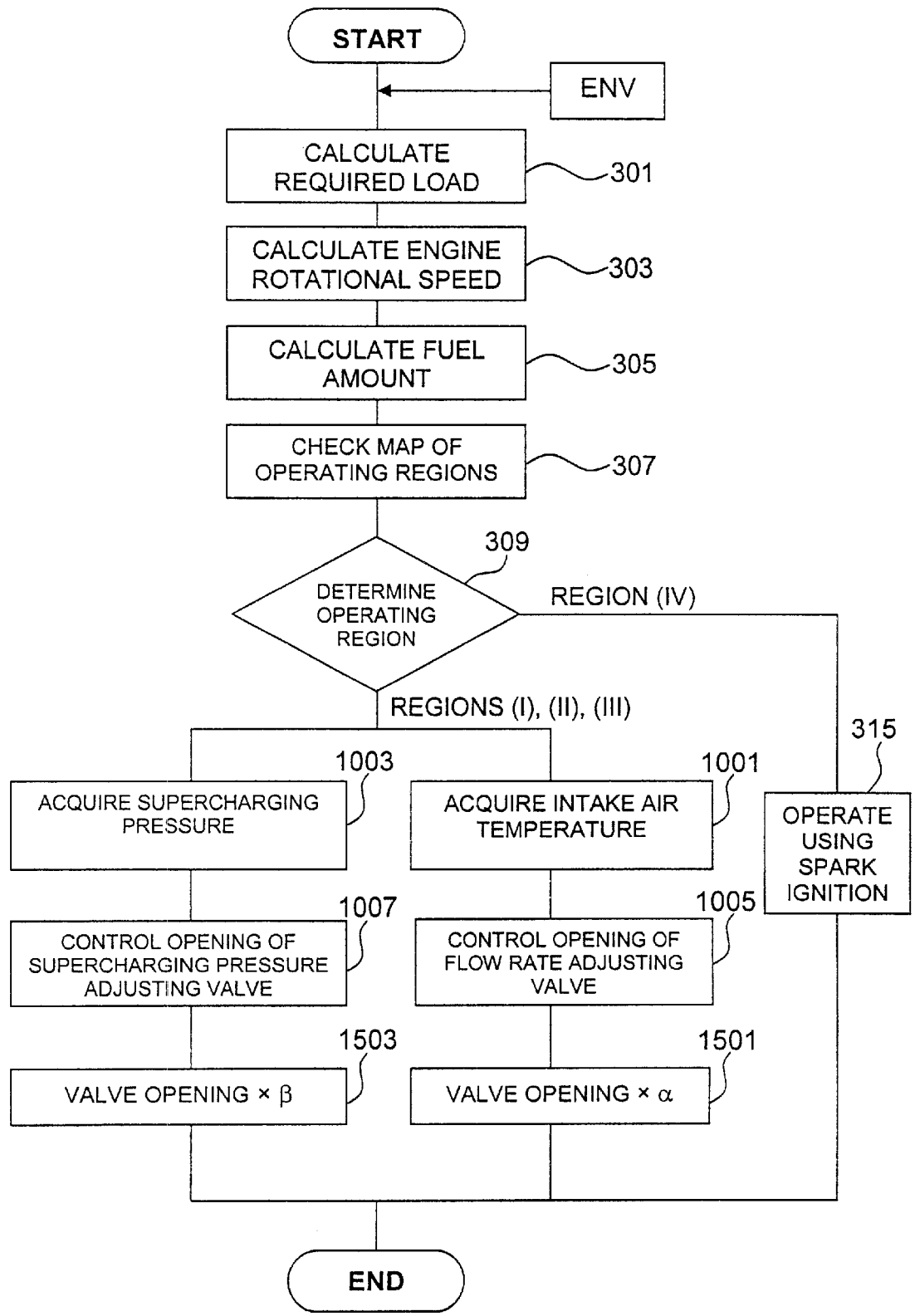
FIG. 17 is a flowchart showing control operations of an electronic control unit used in the fourth embodiment of the present invention.
Figure 18:
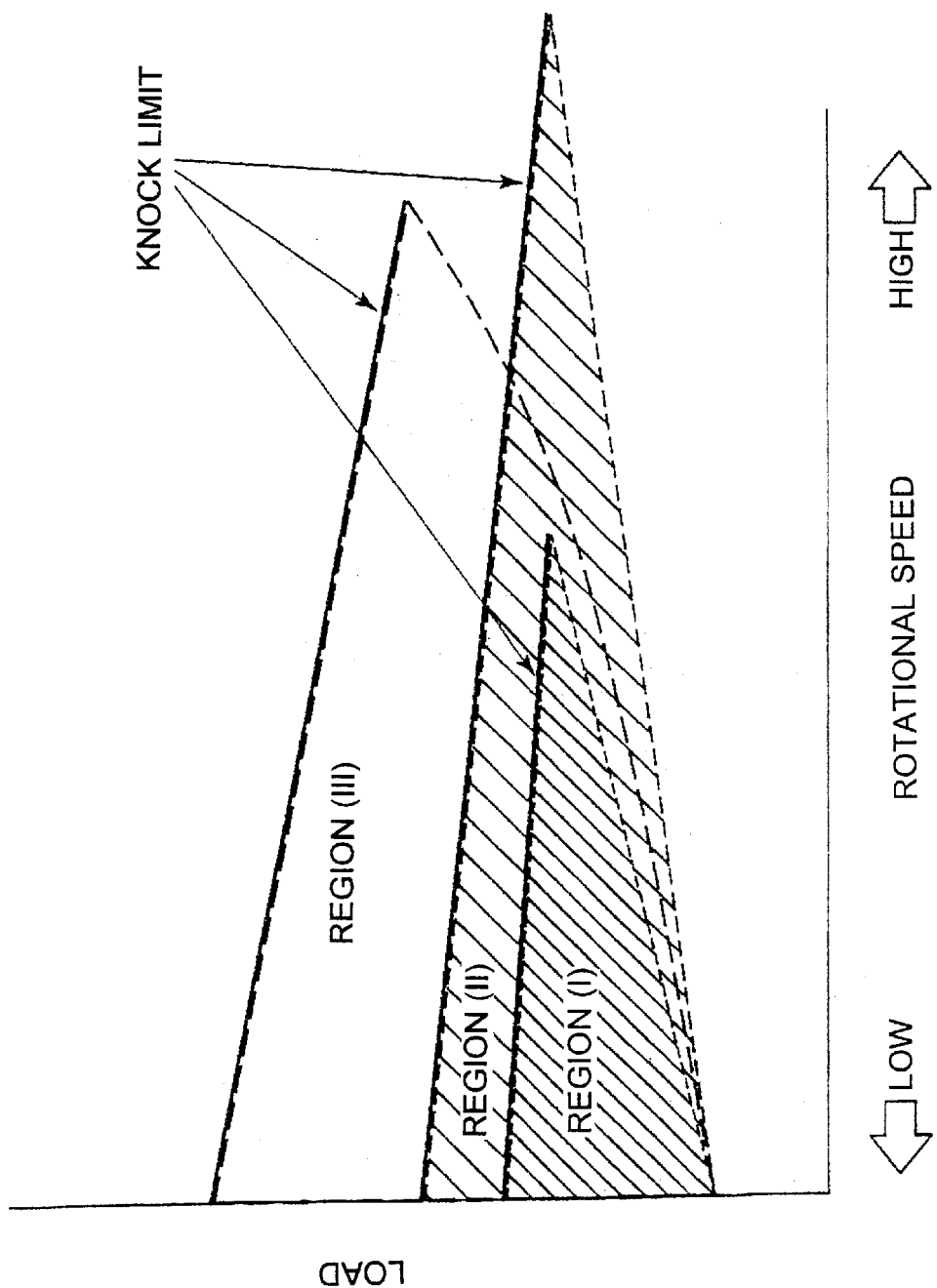
FIG. 18 is an explanatory graph showing the operating region for which self-ignition combustion is possible when the supercharging pressure is constant.
Figure 19:
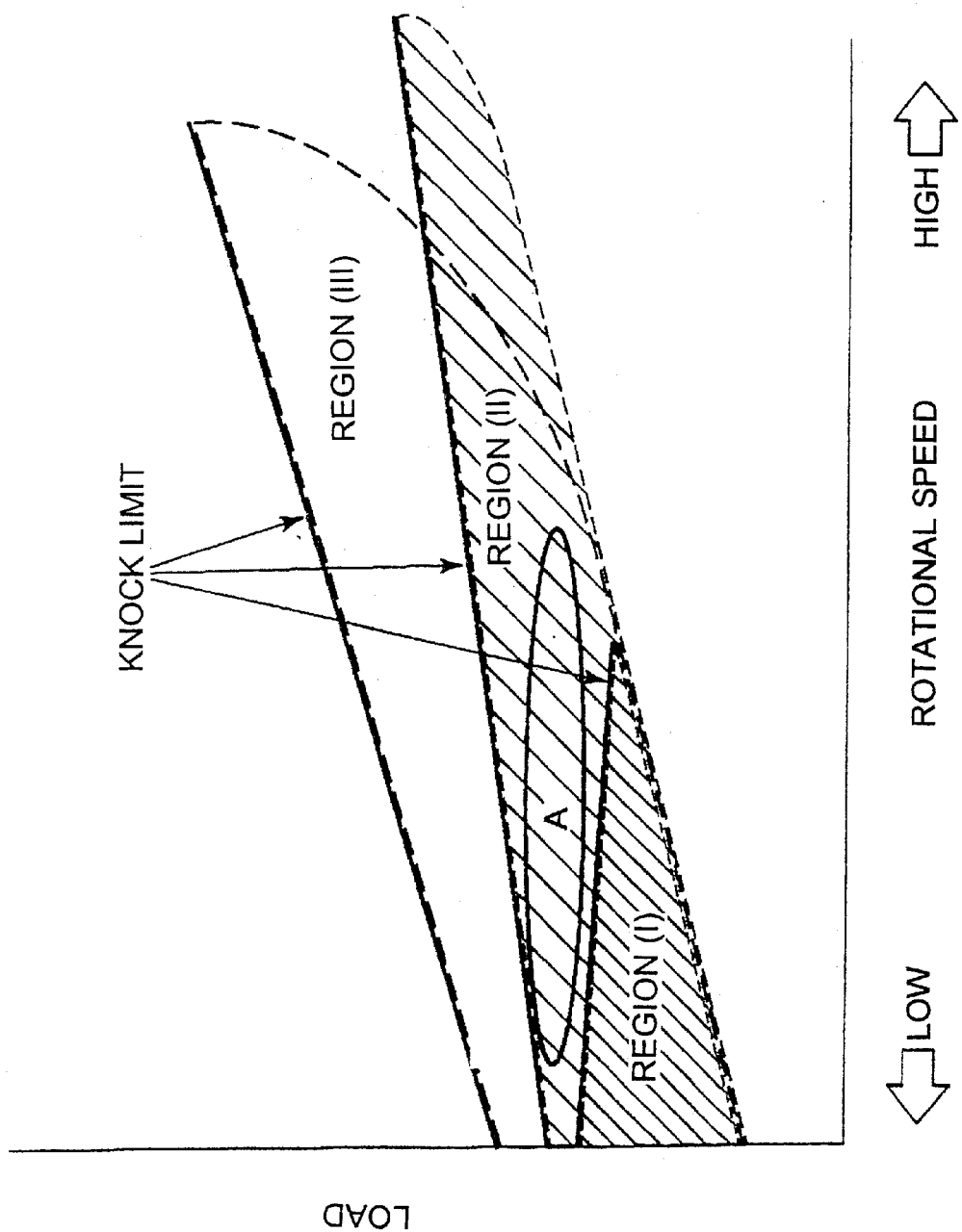
FIG. 19 is an explanatory graph showing the operating region for which self-ignition combustion is possible when the maximum supercharging pressure is used.

In this fourth embodiment, as shown in the flowchart of FIG. 17, the opening correction coefficient $\alpha$ (determined as previously described) is used to correct the opening (step 1501) when the opening of the cooling bypass flow rate adjusting valve 31 is controlled (step 1005) and the opening correction coefficient $\beta$ (determined as previously described) is used to correct the opening (step 1503) when the opening of the supercharging pressure adjusting valve 45 is controlled (step 1007). The other control operations are the same as in the third embodiment, which is illustrated in the flowchart of FIG. 10.

Thus, with the fourth embodiment, the intake air temperature is controlled to the optimum temperature even when the atmospheric temperature changes greatly and the supercharging pressure is controlled to the optimum pressure even when the atmospheric pressure changes greatly, particular when the atmospheric pressure is low at high elevations. As a result, stable self-ignition combustion is possible.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

Moreover, terms that are expressed as "means-plus function" in the claims should include any structure that can be utilized to carry out the function of that part of the present invention. In addition, the term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the present invention as defined in the appended claims. Furthermore, the foregoing description of the embodiments according to the present invention are provided for illustration only, and not for the purpose of limiting the present invention as defined by the appended claims and their equivalents. Thus, the scope of the present invention is not limited to the disclosed embodiments.

What is claimed is:

1. An internal combustion engine comprising:
   a combustion chamber having an intake passage, an exhaust passage and a piston in the chamber for compressive action to cause an air-fuel mixture to self-ignite and combust;
   a supercharger connected to the intake passage upstream of the combustion chamber;
   a cooling device located in the intake passage between the supercharger and the combustion chamber to cool intake air from the supercharger;
   a cooling bypass path having an inlet and an outlet with the inlet fluidly coupled to the intake passage between the supercharger and the cooling device and the outlet fluidly coupled to the intake passage between the cooling device and the combustion chamber;
   a cooling bypass flow rate valve arranged to regulate an opening to adjust an amount of intake air that passes through the cooling bypass path; and
   a controller operatively coupled to the cooling bypass flow rate valve to control the opening of the cooling bypass flow rate valve based on operational conditions of the combustion chamber to perform self-igniting combustion.

2. The internal combustion engine as recited in claim 1, wherein
   the controller is configured to fully open the opening of the cooling bypass flow rate valve such that substantially all of the intake air passes through the cooling bypass path when operating conditions are detected in a predetermined operational region in which engine rotational speed is greater than a predetermined high engine rotational speed value and engine load is less than a predetermined low engine load value such that self-ignition combustion occurs.

3. The internal combustion engine recited in claim 2, further comprising:
   a supercharger bypass passage arranged to bypass the supercharger; and
   a supercharger bypass flow rate valve arranged to regulate an opening to adjust an amount of the intake air flowing to the supercharger bypass passage in response to a detected operating condition.

4. The internal combustion engine as recited in claim 3, wherein
   the cooling bypass flow rate valve is arranged to reduce the intake air flowing to the cooling bypass path when an engine rotational speed is less than a predetermined engine rotational speed value and an engine load is more than a predetermined engine load value, and increase the intake air flowing to the cooling bypass path when the engine rotational speed is more than the predetermined engine rotational speed value and the engine load is less than the predetermined engine load value; and
   the supercharger bypass flow rate valve is arranged to reduce the intake air flowing to the supercharger bypass passage when an engine rotational speed is more than a predetermined engine rotational speed value and an engine load is more than a predetermined engine load value than when the engine rotational speed is less than the predetermined engine rotational speed value and the engine load is less than the predetermined engine load value.

5. The internal combustion engine as recited in claim 3, wherein
   the supercharger bypass flow rate valve is arranged to reduce the amount of the intake air flowing to the supercharger bypass passage when current atmospheric pressure is less than a predetermined pressure value.

6. The internal combustion engine as recited in claim 2, wherein
   the cooling bypass flow rate valve is arranged to reduce the amount of the intake air flowing to the cooling bypass path when current atmospheric temperature is more than a predetermined temperature value.

7. The internal combustion engine as recited in claim 1, wherein
   the controller is configured to control the opening of the cooling bypass flow rate valve such that a portion of the intake air passes through the cooling bypass path when operating conditions are detected in a predetermined operational region in which engine rotational speed is less than a predetermined low engine rotational speed value and engine load is less than a predetermined low engine load value such that self-ignition combustion occurs.

8. The internal combustion engine as recited in claim 7, further comprising:
   a supercharger bypass passage arranged to bypass the supercharger; and
   a supercharger bypass flow rate valve arranged to regulate an opening to adjust an amount of the intake air flowing to the supercharger bypass passage in response to a detected operating condition.

9. The internal combustion engine as recited in claim 8, wherein
   the cooling bypass flow rate valve is arranged to reduce the intake air flowing to the cooling bypass path when an engine rotational speed is less than a predetermined engine rotational speed value and an engine load is more than a predetermined engine load value, and increase the intake air flowing to the cooling bypass path when the engine rotational speed is more than the predetermined engine rotational speed value and the engine load is less than the predetermined engine load value; and
   the supercharger bypass flow rate valve is arranged to reduce the intake air flowing to the supercharger bypass passage when an engine rotational speed is more than a predetermined engine rotational speed value and an engine load is more than a predetermined engine load value than when the engine rotational speed is less than the predetermined engine rotational speed value and the engine load is less than the predetermined engine load value.

10. The internal combustion engine as recited in claim 8, wherein
    the supercharger bypass flow rate valve is arranged to reduce the amount of the intake air flowing to the supercharger bypass passage when current atmospheric pressure is less than a predetermined pressure value.

11. The internal combustion engine as recited in claim 7, wherein
    the cooling bypass flow rate valve is arranged to reduce the amount of the intake air flowing to the cooling bypass path when current atmospheric temperature is more than a predetermined temperature value.

12. The internal combustion engine as recited in claim 1, further comprising:
    a supercharger bypass passage arranged to bypass the supercharger; and
    a supercharger bypass flow rate valve arranged to regulate an opening to adjust an amount of the intake air flowing to the supercharger bypass in response to a detected operating condition.

13. The internal combustion engine as recited in claim 12, wherein
    the cooling bypass flow rate valve is arranged to reduce the intake air flowing to the cooling bypass path when an engine rotational speed is less than a predetermined engine rotational speed value and an engine load is more than a predetermined engine load value, and increase the intake air flowing to the cooling bypass path when the engine rotational speed is more than the predetermined engine rotational speed value and the engine load is less than the predetermined engine load value; and
    the supercharger bypass flow rate valve is arranged to reduce the intake air flowing to the supercharger bypass passage when an engine rotational speed is more than a predetermined engine rotational speed value and an engine load is more than a predetermined engine load value than when the engine rotational speed is less than the predetermined engine rotational speed value and the engine load is less than the predetermined engine load value.

14. The internal combustion engine as recited in claim 13, wherein
    the cooling bypass flow rate valve is arranged to reduce the amount of the intake air flowing to the cooling bypass path when current atmospheric temperature is more than a predetermined temperature value.

15. The internal combustion engine as recited in claim 13, wherein the supercharger bypass flow rate valve is arranged to reduce the amount of the intake air flowing to the supercharger bypass passage when current atmospheric pressure is more than a predetermined pressure value.

16. An internal combustion engine, comprising:

compression combustion means for self-igniting and combusting an air-fuel mixture by utilizing a compressive action during operating conditions where compression self-igniting combustion is conducted;

supercharging means for supercharging intake air that is fed to the compression combustion means;

cooling means for cooling the intake air to a reduced temperature after supercharging, the cooling means being disposed between the supercharging means and the compression combustion means; and temperature control means for increasing temperature of the intake air flowing into the compression combustion means to a temperature that is higher than the reduced temperature of the intake air immediately downstream of the cooling means when the compression combustion means is operating in a prescribed operating region among the operating regions where compression self-ignition combustion is conducted.

17. An internal combustion engine comprising:

a combustion chamber having an intake passage, an exhaust passage and a piston in the chamber for compressive action to selectively cause an air-fuel mixture to self-ignite and combust;

a spark device arranged relative to the combustion chamber to selectively ignite and combust the air-fuel mixture in the combustion chamber;

a supercharger connected to the intake passage upstream of the combustion chamber;

a cooling device located in the intake passage between the supercharger and the combustion chamber to cool intake air from the supercharger;

a cooling bypass path having an inlet and an outlet with the inlet fluidly coupled to the intake passage between the supercharger and the cooling device and the outlet fluidly coupled to the intake passage between the cooling device and the combustion chamber;

a cooling bypass flow rate valve arranged to regulate an opening to adjust an amount of intake air that passes through the cooling bypass path; and a controller operatively coupled to the cooling bypass flow rate valve to control the opening of the cooling bypass flow rate valve based on operational conditions of the combustion chamber to selectively perform self-igniting combustion, the controller being operatively coupled to the spark device to control operation of the spark device based on operational conditions of the combustion chamber to selectively perform spark ignition combustion.

18. The internal combustion engine as recited in claim 17, wherein the controller is configured to fully open the opening of the cooling bypass flow rate valve such that substantially all of the intake air passes through the cooling bypass path when operating conditions are detected in a predetermined operational region in which engine rotational speed is greater than a predetermined high engine rotational speed value and engine load is less than a predetermined low engine load value such that self-ignition combustion occurs.

19. The internal combustion engine as recited in claim 17, wherein the controller is configured to control the opening of the cooling bypass flow rate valve such that a portion of the intake air passes through the cooling bypass path when operating conditions are detected in a predetermined operation region in which engine rotational speed is less than a predetermined low engine rotational speed value and engine load is less than a predetermined low engine load value such that self-ignition combustion occurs.

20. The internal combustion engine as recited in claim 17, further comprising:

a supercharger bypass passage arranged to bypass the supercharger; and a supercharger bypass flow rate valve arranged to regulate an opening to adjust an amount of the intake air flowing to the supercharger bypass passage in response to a detected operating condition.

* * * * *